(12) United States Patent
Liu et al.

(10) Patent No.: US 9,664,945 B2
(45) Date of Patent: May 30, 2017

(54) DISPLAY APPARATUS

(71) Applicants: Au Optronics Corporation, Hsinchu (TW); University of Central Florida Research Foundation , Inc., Orlando, FL (US)

(72) Inventors: Yi-Fan Liu, Orlando, FL (US); Shin-Tson Wu, Orlando, FL (US); Yi-Fen Lan, Taichung (TW); Cheng-Yeh Tsai, Taipei (TW)

(73) Assignees: Au Optronics Corporation, Hsinchu (TW); University of Central Florida Research Foundation, Inc., Orlando, FL (US)

( * ) Notice: Subject to any disclaimer, the term of this patent is extended or adjusted under 35 U.S.C. 154(b) by 121 days.

(21) Appl. No.: 14/100,029

(22) Filed: Dec. 9, 2013

(65) Prior Publication Data
US 2014/0300847 A1  Oct. 9, 2014

Related U.S. Application Data

(60) Provisional application No. 61/806,411, filed on Mar. 29, 2013.

(51) Int. Cl.
| | |
|---|---|
| *G02F 1/1335* | (2006.01) |
| *G02F 1/13363* | (2006.01) |
| *G02F 1/1343* | (2006.01) |
| *G02F 1/139* | (2006.01) |
| *G02F 1/137* | (2006.01) |

(52) U.S. Cl.
CPC .... *G02F 1/133528* (2013.01); *G02F 1/13363* (2013.01); *G02F 1/134363* (2013.01);
(Continued)

(58) Field of Classification Search
CPC .......... G02F 1/133528; G02F 1/13363; G02F 1/134363; G02F 1/1396;
(Continued)

(56) References Cited

U.S. PATENT DOCUMENTS 6,172,721 B1 * 1/2001 Murade ................ G02F 1/1368
257/72
6,285,430 B1    9/2001 Saito
(Continued)

FOREIGN PATENT DOCUMENTS

TW    200745675    12/2007
TW    200834170    8/2008

*Primary Examiner* — Edward Glick
*Assistant Examiner* — David Chung
(74) *Attorney, Agent, or Firm* — Jianq Chyun IP Office

(57) ABSTRACT

A display apparatus including a display panel, a first polarizer and a second polarizer is provided. The display panel includes a pixel array substrate, an opposite substrate and a display medium. The pixel array substrate includes a plurality of pixel units. Each pixel unit includes a first electrode and a second electrode. The first electrode and the second electrode are alternately arranged and a lateral electric field is existed between the first electrode and the second electrode. The opposite substrate is disposed opposite to the pixel array substrate. The display medium is disposed between the pixel array substrate and the opposite substrate. The first polarizer is disposed on the pixel array substrate. The second polarizer is disposed on the opposite substrate. An included angle between an optical axis of the first polarizer and an optical axis of the second polarizer is 90°±θ, and θ is 1° to 9°.

5 Claims, 14 Drawing Sheets

(52) U.S. Cl.
CPC .. *G02F 1/1396* (2013.01); *G02F 2001/13793* (2013.01); *G02F 2001/133531* (2013.01); *G02F 2001/134372* (2013.01); *G02F 2413/01* (2013.01); *G02F 2413/02* (2013.01); *G02F 2413/03* (2013.01); *G02F 2413/12* (2013.01)

(58) Field of Classification Search
CPC ........ G02F 2001/133531; G02F 2001/134372; G02F 2001/13793; G02F 2413/01; G02F 2413/02; G02F 2413/03; G02F 2413/12
USPC .......................... 349/96, 103, 117–121, 141
See application file for complete search history.

(56) References Cited

U.S. PATENT DOCUMENTS

| | | | |
|---|---|---|---|
| 6,642,980 B1 * | 11/2003 | Bignolles | G02F 1/133632 349/117 |
| 7,583,334 B2 | 9/2009 | Maeda | |
| 7,847,898 B2 * | 12/2010 | Jeon | G02F 1/13363 349/119 |
| 2002/0167633 A1 * | 11/2002 | Park | G02F 1/134363 349/141 |
| 2005/0057704 A1 * | 3/2005 | Ootake | G02F 1/133555 349/69 |
| 2005/0157225 A1 | 7/2005 | Toyooka et al. | |
| 2007/0132928 A1 * | 6/2007 | Yao | G02F 1/133634 349/118 |
| 2008/0117365 A1 | 5/2008 | Maeda | |
| 2009/0066863 A1 * | 3/2009 | Chen | G02F 1/13363 349/13 |
| 2011/0141415 A1 * | 6/2011 | Lee | G02F 1/13363 349/118 |
| 2012/0280953 A1 | 11/2012 | Cheng et al. | |
| 2012/0327342 A1 * | 12/2012 | Kim | G02F 1/13363 349/117 |

* cited by examiner

DISPLAY APPARATUS

CROSS-REFERENCE TO RELATED APPLICATION

This application claims the priority benefits of U.S. provisional application Ser. No. 61/806,411, filed on Mar. 29, 2013. The entirety of the above-mentioned patent applications is hereby incorporated by reference herein and made a part of this specification.

BACKGROUND OF THE INVENTION

Technical Field

The invention of the disclosure generally relates to a display apparatus, and more particularly to a display apparatus having polarizers being disposed non-orthogonally.

Description of Related Art

In response to consumers demand, manufacturers of display apparatus industry have invested in development of a blue phase liquid crystal display apparatus having quick response characteristic. Taking a blue phase liquid crystal material for example, a lateral electric field is required so the blue phase liquid crystal material can be operated as a light valve. An electrode design with a In-Plane Switching (IPS) display module has been utilized to drive blue phase liquid crystal molecules in the blue phase liquid crystal display apparatus.

Generally, when a display apparatus has a favorable performance in dark state or bright state, a display contrast ratio may be enhanced to provide a more preferable display quality for display apparatus. However, when a light leakage occurs on the display apparatus, the dark state may have a poor performance which affects the display quality. Therefore, how to reduce light leakage of a display apparatus in order to enhance the contrast ratio has become an important research topic for person skilled in the art.

SUMMARY

The invention of the disclosure is directed to a display apparatus disposed with an optical film having an optical axis shafted by an angle, so to reduce its light leakage for providing a favorable display quality.

The embodiment of the invention provides a display apparatus. The display apparatus includes a display panel, a first polarizer and a second polarizer. The display panel includes a pixel array substrate, an opposite substrate and a display medium. The pixel array substrate includes a plurality of pixel units. Each pixel unit includes a first electrode and a second electrode. The first electrode and the second electrode are alternately arranged and a lateral electric field is existed between the first electrode and the second electrode. The opposite substrate is disposed opposite to the pixel array substrate. The display medium is disposed between the pixel array substrate and the opposite substrate. The first polarizer is disposed on the pixel array substrate. The second polarizer is disposed on the opposite substrate. An included angle between an optical axis of the first polarizer and an optical axis of the second polarizer is $90°±θ1$, and $θ1$ is $1°$ to $9°$.

The embodiment of the invention provides a display apparatus. The display apparatus includes a display panel, a first polarizer, a second polarizer, a first positive A-plate compensation film and a second positive A-plate compensation film. The display panel includes a pixel array substrate, an opposite substrate and a display medium. The pixel array substrate includes a plurality of pixel units. Each pixel unit includes a first electrode and a second electrode. The first electrode and the second electrode are alternately arranged and a lateral electric field is existed between the first electrode and the second electrode. The opposite substrate is disposed opposite to the pixel array substrate. The display medium is disposed between the pixel array substrate and the opposite substrate. The first polarizer is disposed on the pixel array substrate. The second polarizer is disposed on the opposite substrate. A first included angle between a first optical axis of the first polarizer and a second optical axis of the second polarizer is $90°$. The first positive A-plate compensation film is disposed on the pixel array substrate, and located between the display panel and the first polarizer. A second included angle is provided between the first optical axis of the first polarizer and a fifth optical axis of the first positive A-plate compensation film. The second positive A-plate compensation film is disposed on the opposite substrate, and located between the display panel and the second polarizer. A third included angle is provided between the first optical axis of the first polarizer and a sixth optical axis of the second positive A-plate compensation film. The second included angle is $0°−θ1$ and $θ1$ is $1°$ to $9°$ while the third included angle is $0°+θ2$ and $θ2$ is $1°$ to $9°$, or the second included angle is $0°+θ1$ and $θ1$ is $1°$ to $9°$ while the third included angle is $0°−θ2$ and $θ2$ is $1°$ to $9°$.

The embodiment of the invention provides a display apparatus. The display apparatus includes a display panel, a first polarizer, a second polarizer and a compensation film. The display panel includes a pixel array substrate, an opposite substrate and a display medium. The pixel array substrate includes a plurality of pixel units. Each pixel unit includes a first electrode and a second electrode. The first electrode and the second electrode are alternately arranged and a lateral electric field is existed between the first electrode and the second electrode. The opposite substrate is disposed opposite to the pixel array substrate. The display medium is disposed between the pixel array substrate and the opposite substrate. The first polarizer is disposed on the pixel array substrate. The second polarizer is disposed on the opposite substrate. An included angle between an optical axis of the first polarizer and an optical axis of the second polarizer is $90°$. The compensation film is disposed on the pixel array substrate, and located between the display panel and the first polarizer. The compensation film is composed of a plurality of twist nematic liquid crystal molecules. Among the twist nematic liquid crystal molecules, an included angle is provided between a seventh optical axis of a first twist nematic liquid crystal molecule closest to the first polarizer and an eighth optical axis of a second twist nematic liquid crystal molecule closest to the display panel, and the included angle is $0°±θ$, and $θ$ is $1°$ to $9°$.

The embodiment of the invention provides a display apparatus. The display apparatus includes a display panel, a first polarizer and a second polarizer. The display panel includes a pixel array substrate, an opposite substrate and a display medium. The pixel array substrate includes a plurality of pixel units. The opposite substrate is disposed opposite to the pixel array substrate. The display medium is disposed between the pixel array substrate and the opposite substrate. The first polarizer is disposed on the pixel array substrate. The second polarizer is disposed on the opposite substrate, in which an included angle is provided between an optical axis of the first polarizer and an optical axis of the second polarizer. The included angle is greater than $90°$ when the display medium is a dextrorotatory material, and the included angle is less than 90° when the display medium is a levorotatory material.

Based on above, in the display apparatus according to embodiments of the invention, which is disposed with an optical film having an optical axis shafted by an angle in which the angle is 1° to 9°. As a result, the light leakage generated by the display apparatus can be reduced so as to enhance the display contrast ratio of the display apparatus for improving the display quality.

To make the above features and advantages of the disclosure more comprehensible, several embodiments accompanied with drawings are described in detail as follows.

DESCRIPTION OF THE EMBODIMENTS

First Embodiment

Figure 1:
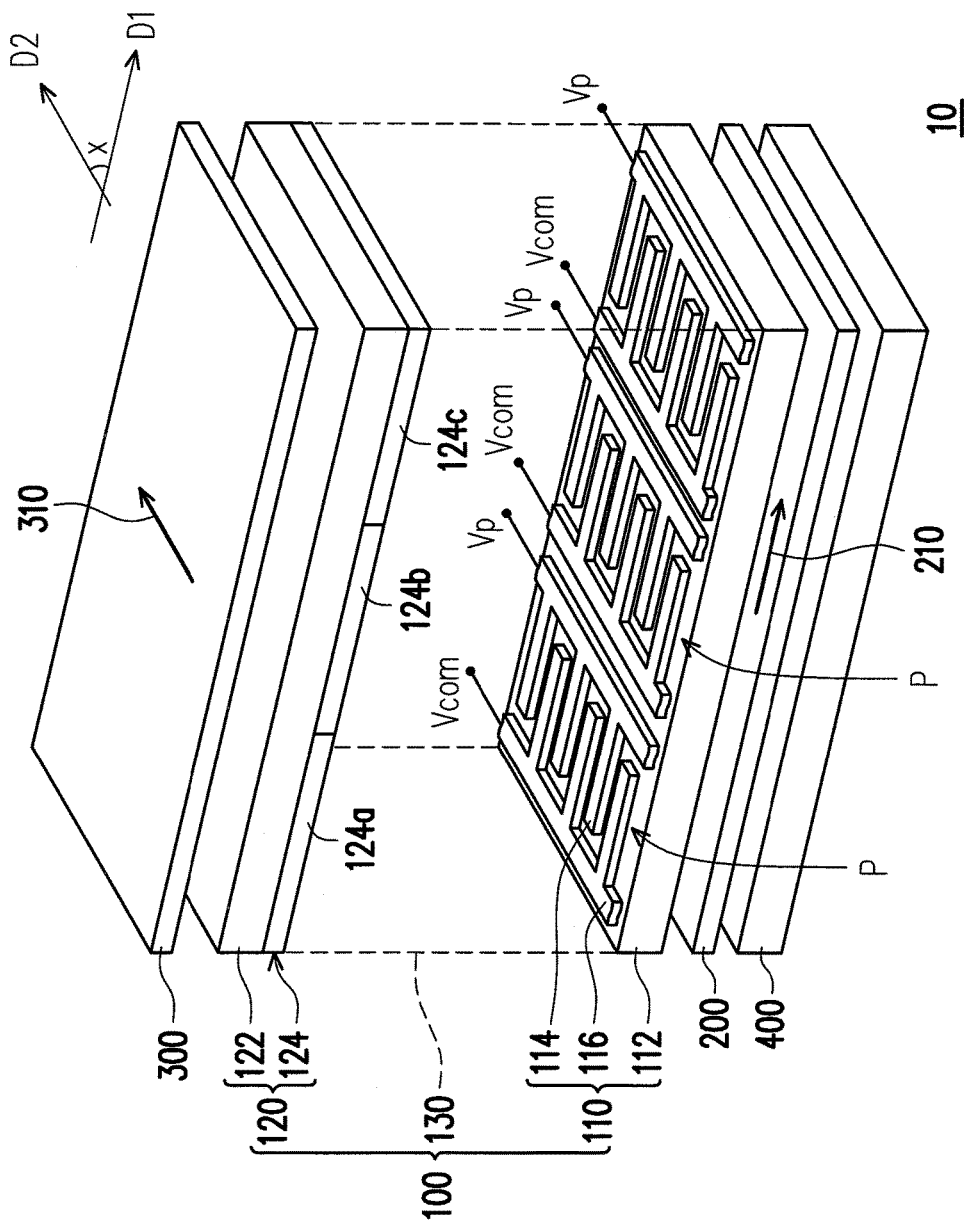
FIG. 1 is a three-dimensional schematic diagram of a display apparatus according to an embodiment of the invention.
Figure 2A:
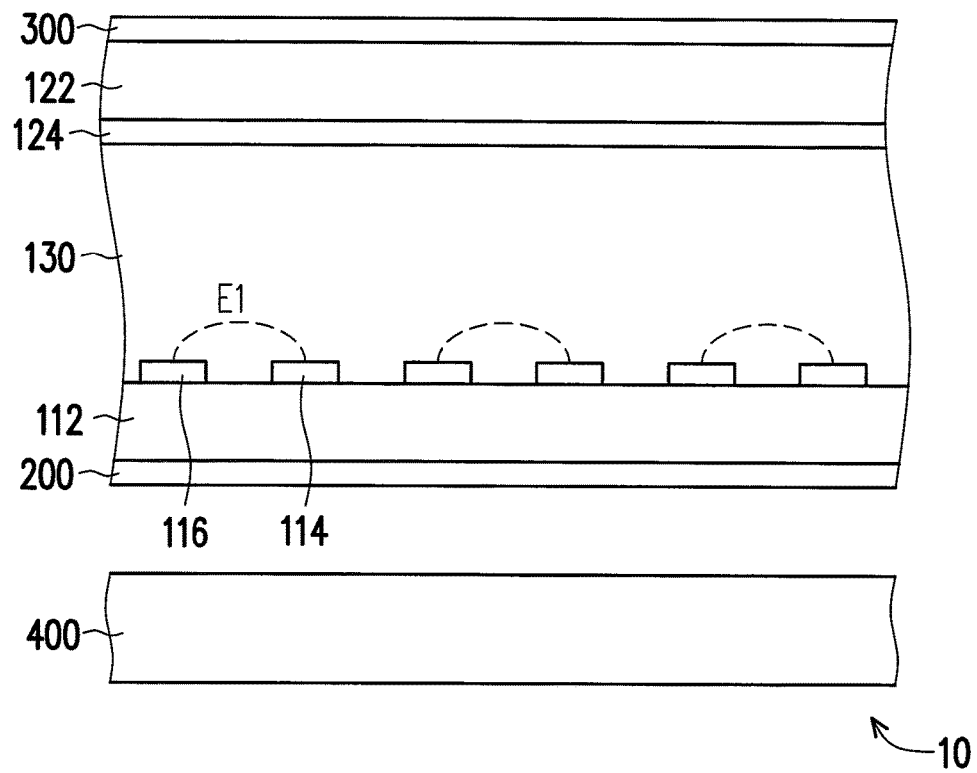
FIG. 2A is a partial cross-sectional schematic diagram of the display apparatus depicted in FIG. 1.

FIG. 1 is a three-dimensional schematic diagram of a display apparatus according to an embodiment of the invention. FIG. 2A is a partial cross-sectional schematic diagram of the display apparatus depicted in FIG. 1. Referring to FIG. 1 and FIG. 2A, a display apparatus 10 of the present embodiment includes a display panel 100, a first polarizer 200, a second polarizer 300 and a light source module 400. The light source module 400 is disposed at one side of the display panel 100, and an incident light is provided by the light source module 400 to the display panel 100. The display panel 100 includes a pixel array substrate 110, an opposite substrate 120 and a display medium 130.

The pixel array substrate 110 includes a plurality of pixel units P. The pixel units P are disposed on a first substrate 112 in an array. Each of the pixel units P includes a first electrode 114 and a second electrode 116. The first electrode 114 and the second electrode 116 are alternately disposed on the first substrate 112. When the first electrode 114 and the second electrode 116 are applied with a voltage, a lateral electric field E1 is formed between the first electrode 114 and the second electrode 116, in which the lateral electric field E1 is substantially parallel to a surface of the first substrate 112. In the present embodiment, the first electrode 114 and the second electrode 116 are in a same film and disposed on a same plane, which means that the display apparatus 10 of the present embodiment is of an In-Plane Switch (IPS) design.

Figure 2B:
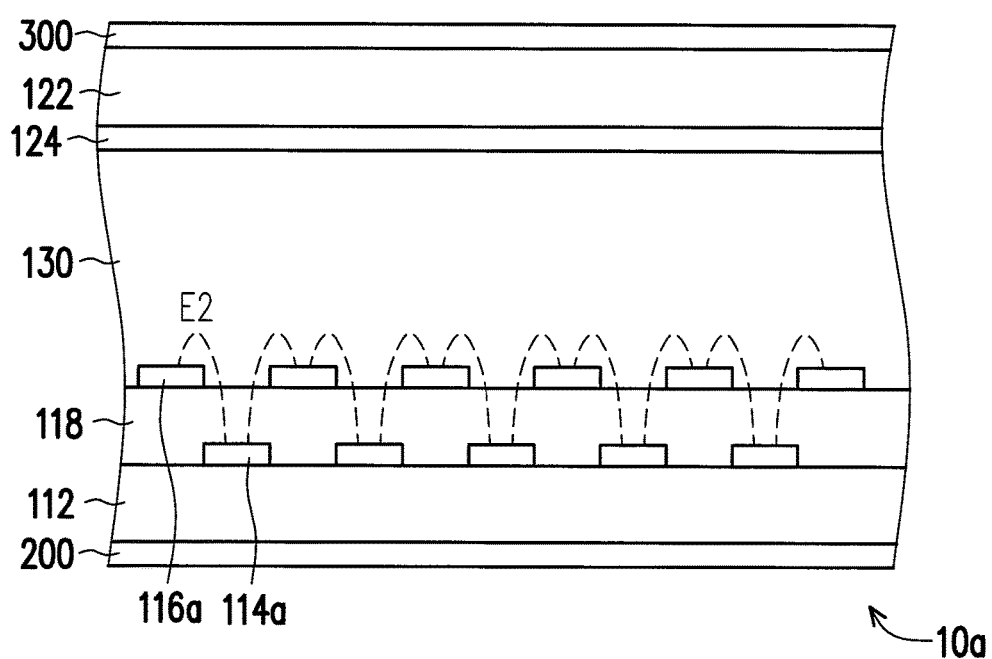
FIG. 2B is a partial cross-sectional schematic diagram of a display apparatus according to another embodiment of the invention.

In another embodiment, as shown in FIG. 2B, the first electrode 114 and the second electrode 116 may also be in different films and disposed on different planes, in which an insulating layer 118 is disposed between the first electrode 114 and the second electrode 116 so that the first electrode 114 is electrically isolated with the second electrode 116. In the embodiment of FIG. 2B, when the first electrode 114 and the second electrode 116 are applied with a voltage, a lateral electric field E2 may be formed between the first electrode 114 and the second electrode 116. A display apparatus of the FIG. 2 is of a Fringe Field Switch (FFS) design. However, the invention is not limited herein. It falls in the scope of the invention for which protection is sought as long as the display apparatus has an electrode design of the lateral electric field.

In the forgoing embodiment, the first electrode 114 and the second electrode 116 are, for example, a transparent electrode including a metal oxide such as indium tin oxide, indium zinc oxide, aluminum tin oxide, aluminum zinc oxide, indium germanium zinc oxide or other suitable metal oxides, or a stacked layer having at least two of above.

Figure 3:
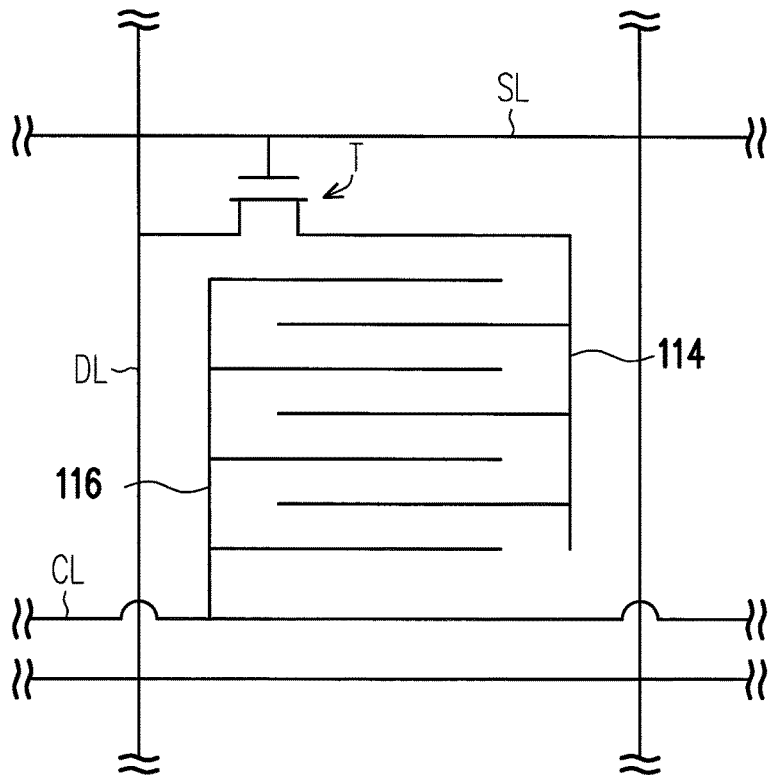
FIG. 3 is a circuit schematic diagram illustrating pixel units of the display apparatus depicted in FIG. 1.

FIG. 3 is a circuit schematic diagram illustrating pixel units of the display apparatus depicted in FIG. 1. Referring to FIG. 1 and FIG. 3, the first electrode 114 of the present embodiment is electrically connected to an active device T, and the first electrode 114 is applied by, for example, a first voltage Vp. The second electrode 116 is electrically connected to a common electrode line CL, and the second electrode 116 is applied by, for example, a second voltage Vcom. The active device T has a terminal connected to a scan line SL and another terminal connected to a data line DL. Herein, the active device T may be a switch device for controlling whether a driving voltage information is applied to the first electrode 114, and a type of the active device T may be a bottom gate thin film transistor or a top gate thin film transistor. When the active device T is turned on, the first electrode 114 is applied with a voltage having a voltage value different from a voltage value of the common electrode line CL, such that a voltage difference is provided between the first electrode 114 and the second electrode 116. In this case, the lateral electric field E1 is generated between the first electrode 114 and the second electrode 116 so as to drive the display medium 130.

Referring back to FIG. 1 and FIG. 2A, the opposite substrate 120 is disposed at an opposite side of the pixel array substrate 110. The opposite substrate 120 includes a second substrate 122 and a color filter layer 124 disposed on the second substrate 122. The color filter layer 124 includes a first filter pattern 124a, a second filter pattern 124b and a third filter pattern 124c. In the present embodiment, the first filter pattern 124a, the second filter pattern 124b and the third filter pattern 124c are a red filter pattern, a green filter pattern and a blue filter pattern, respectively. Nevertheless, the invention is not limited herein. Configuration of the color filter patterns may be changed by person skilled in the art based on actual requirements. In addition, the present embodiment is described using an example of the opposite substrate 120 as the color filter substrate. However, the invention is not limited herein. In other embodiments, the color filter layer 124 may also be disposed on the pixel array substrate 110, so as to form a COA (Color filter on Array) substrate with the color filter layer 124 integrated on a thin film transistor array, or a AOC (Array on Color filter) substrate with a thin film transistor array integrated on the color filter layer 124.

The display medium 130 is disposed between the pixel array substrate 110 and the opposite substrate 120. In the present embodiment, the display medium 130 is optically isotropic before being applied with the lateral electric field E1, and the display medium 130 is optically anisotropic after being applied with the lateral electric field E1 for driving. According to the present embodiment, the display medium 130 includes blue phase liquid crystals such as a polymer-stabilized blue phase liquid crystals or a polymer-stabilized isotropic phase liquid crystals. In the present embodiment, the display medium 130 is driven by forming of the lateral electric field E1, so the display medium 130 may switch between the optical isotropy and the optical anisotropy thereby allowing the display medium 130 to function as a light valve.

The first polarizer 200 is disposed on the pixel array substrate 110, and the second polarizer 300 is disposed on the opposite substrate 120. In FIG. 1, it is described using an example of the first polarizer 200 and the second polarizer 300 which are disposed at two opposite outer sides of the display panel 100, respectively, but the invention is not limited thereto. In other embodiments, the first polarizer 200 and the second polarizer 300 may also be integrated at an inner side of the display panel 100.

The first polarizer 200 has a first optical axis 210 and the second polarizer 300 has a second optical axis 310, in which the first optical axis 210 is parallel to a first direction D1 and the second optical axis 310 is parallel to a second direction D2. As shown in FIG. 1, an included angle x is provided between the first optical axis 210 and the second optical axis 310. In the present embodiment, the included angle x is $90°±θ1$, and $θ1$ is $1°$ to $9°$. In other embodiments, $θ1$ is $1.5°$ to $6.5°$, and $θ1$ is more preferable to be $1.5°$ to $3.5°$. More specifically, when the included angle x between the first optical axis 210 of the first polarizer 200 and the second optical axis 310 of the second polarizer 300 is $90°±θ1$, and $θ1$ is $1°$ to $9°$, the light leakage of the display apparatus 10 may be further reduced, so as to further enhance the display contrast ratio of the display apparatus 10.

Generally, in the display apparatus having display medium driven by the lateral electric field, two polarizers are usually disposed on the opposite sides of the display panel, and the optical axes of the two polarizers are usually orthogonal (i.e., the included angle between the optical axes of the two polarizers is $90°$), so as to exhibit a light blocking effect for reducing the light leakage. However, it is further discovered that, certain degree of light leakage may still occur even though the two polarizers are configured to be orthogonal. Accordingly, in the invention, rotating the first polarizer 200 oppositely (including levorotation or dextrorotation) with respect to the second polarizer 300 with a specific angle may reduce the light leakage of the display apparatus 10, so as to enhance the display quality of the display apparatus 10.

More specifically, the display medium 130 according to the present embodiment is, for example, a blue phase liquid crystal. The blue phase liquid crystal may be optically anisotropic once being applied with the lateral electric field E1. In this case, the blue phase liquid crystal has a polarization rotation characteristic. An incident light passing through the blue phase liquid crystal may generate an emerging light, and a direction of the emerging light may shift for a specific angle with respect to a predetermined emerging light due to the polarization rotation characteristic. Said specific angle is known as a polarization rotation angle (i.e., $θ$). More specifically, the blue phase liquid crystal molecules are aligned in form of a double twist cylinder, and a polarization phenomena as mentioned above is caused by said alignment. Therefore, the blue phase liquid crystal fails to adjust the direction of the incident light to the predetermined direction owing to the polarization rotation characteristic, such that the light leakage may occur since a certain degree of a deviation angle is existed. Accordingly, in the invention, the optical axis direction of the polarizer is adjusted so the included angle between the optical axes of the polarizers is not $90°$ (i.e., $90°±θ1$), and then the deviation angle (i.e., $θ1$) of the optical axis of the polarizer is further increased or reduced on a basis of $90°$. As a result, a blocking effect of the polarizer may be improved to enhance the display contrast ratio of the display apparatus 10. More specifically, the invention achieves the blocking effect by shifting the deviation angle $θ1$ of the optical axis of the polarizer as identical to the polarization rotation angle $θ$, so as to enhance the display contrast ratio of the display apparatus 10.

Generally, a material of the display medium may be a levorotatory material and a dextrorotatory material. Herein, when the polarizer has the light leakage ratio reduced after being rotated towards a positive direction while having the light leakage ratio increased after being rotated towards a negative direction, this indicates that such display medium belongs to the dextrorotatory material. On the contrary, when the polarizer has the light leakage ratio increased after being rotated towards the positive direction while having the light leakage ratio reduced after being rotated towards the negative direction, this indicates that the display medium belongs to the levorotatory material. In other words, the included angle between the two polarizers is greater than $90°$ when the display medium is the dextrorotatory material; and the included angle between the two polarizers is less than $90°$ when the display medium is the levorotatory material.

In an embodiment, when the display medium is the dextrorotatory material, the included angle between the two polarizers is $90°+θ1$, and $θ1$ is $1°$ to $9°$. In a more preferable embodiment, $θ$ is $1.5°$ to $6.5°$. In addition, in another embodiment, when the display medium is the levorotatory material, the included angle between the two polarizers is 90°−θ1, and θ1 is 1° to 9°. In a more preferable embodiment, θ1 is 1.5° to 6.5°.

Based on above, it can be known that the invention enhances the display contrast ratio of the display apparatus 10 by shifting the deviation angle θ1 of the optical axis of the polarizer as identical to the polarization rotation angle θ. Hereinafter, multiple embodiments are illustrated to further describe the polarization rotation angle θ.

It is further discovered in the invention that, in the design of the included angle between the first polarizer 200 and the second polarizer 300, the polarization rotation angle θ can be expressed by following equation.

$$\theta = \frac{\varphi_0 d(\Delta n_{(\lambda,T)})^2}{\left(\frac{\lambda^2}{\lambda_B^2} - 1\right)}$$

d is a gap between the pixel array substrate and the opposite substrate, $\Delta n_{(\lambda,T)}$ is a refractive index of the display medium, $\lambda$ is a wavelength of the incident light and $\lambda_B$ is a Bragg reflection wavelength of the material of the display medium. $\varphi_0$ is an empirical constant from experiment.

Figure 4:
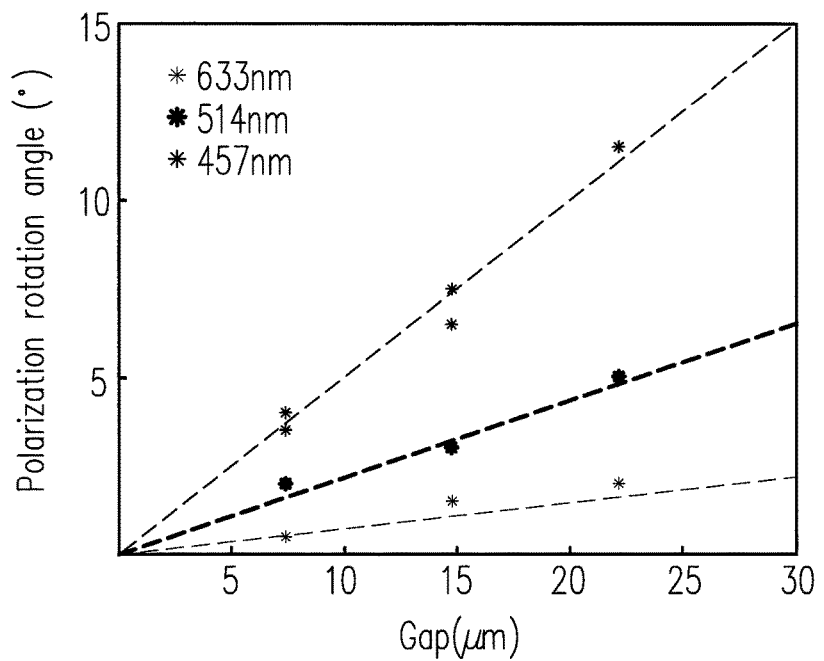
FIG. 4 is a relation diagram of a polarization rotation angle and a gap in a display apparatus according to an embodiment of the invention.

FIG. 4 is a relation diagram of a polarization rotation angle θ and a gap d in a display apparatus according to an embodiment of the invention, in which the display apparatus is irradiated by the incident lights with different wavelengths (633 nm, 514 nm and 457 nm). In view of FIG. 4, the polarization rotation angle θ and the gap d is substantially a directly proportional.

Figure 5:
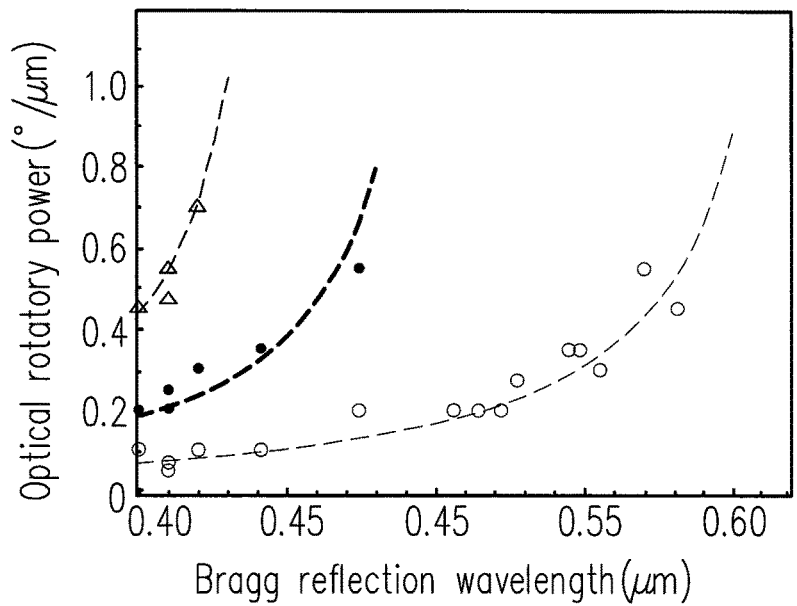
FIG. 5 is a relation diagram of an optical rotatory power and a Bragg reflection wavelength in a display apparatus according to an embodiment of the invention.

FIG. 5 is a relation diagram of an optical rotatory powers and a Bragg reflection wavelength in a display apparatus according to an embodiment of the invention, in which the optical rotatory power is the ratio of the polarization rotation angle θ and the gap d, $\Delta n_{(\lambda,T)}$ is approximately 0.18 and an empirical constant $\varphi_0$ is 3.05°/μm. In FIG. 5, curves from left to right indicate that the wavelengths $\lambda$ of the incident lights are 457 nm(△), 514 nm(●) and 633 nm(○), respectively. In view of the curves of FIG. 5, the optical rotatory power and the Bragg reflection wavelength of the display apparatus according to present embodiment of the invention can be expressed by following equation.

$$\theta = \frac{\varphi_0 d(\Delta n_{(\lambda,T)})^2}{\left(\frac{\lambda^2}{\lambda_B^2} - 1\right)}$$

Figure 6:
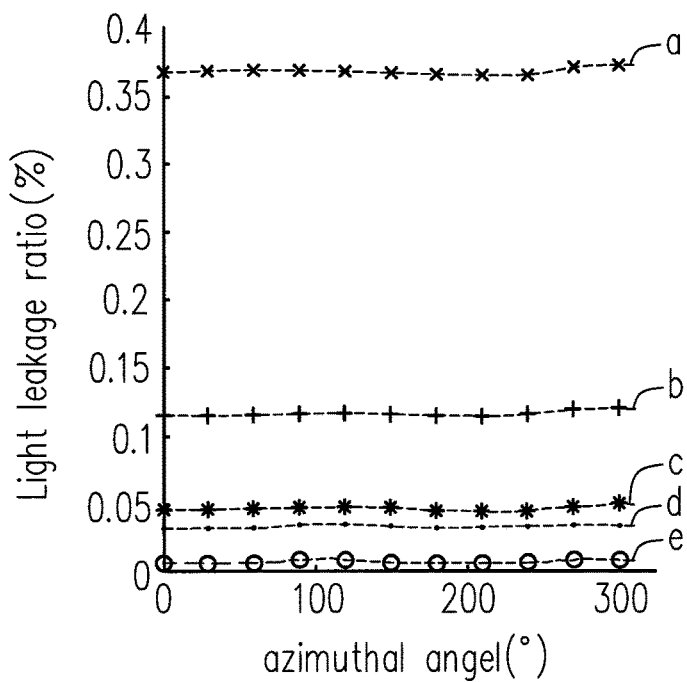
FIG. 6 is a relation diagram of a light leakage ratio and an azimuthal angle in a plurality of display apparatuses.

FIG. 6 is a relation diagram of a light leakage ratio and an azimuthal angle in a plurality of display apparatuses, in which all of said display apparatuses are of the In-Plane Switch (IPS) design, the wavelength $\lambda$, of the incident light is 514 nm, the refractive index $\Delta n_{(\lambda,T)}$ is approximately 0.18, the gap d is 7.4 μm and the Bragg reflection wavelength $\lambda_B$ is approximately 410 nm. Based on simulation and experiment, it is obtained that the polarization rotation angle θ should be designed to 1.6°. In this case, referring to FIG. 6, curve a represents an embodiment of the polarization rotation angle θ being rotated to the left by 1°, curve b represents a comparison example of the polarization rotation angle θ is 0°, curve c represents an embodiment of the polarization rotation angle θ being rotated to the right by 1°, curve d represents an embodiment of the polarization rotation angle θ being rotated to the right by 3°, and curve e represents an embodiment of the polarization rotation angle θ being rotated to the right by 2°.

In the embodiment of FIG. 6, the azimuthal angle is an angle for rotating the display apparatus. For instance, after fixing the direction of the incident light, the display apparatus is rotated, so as to obtain different azimuthal angles. Since an included angle of light component between the electrode and the incident light in the display apparatus may be changed according to said different azimuthal angles, the light valve of the display medium may also be affected to cause the light leakage. In view of FIG. 6, the light leakage ratios of said different azimuthal angles in various degrees are similar to each other. In other words, with said different azimuthal angles, the light leakage may be reduced and the contrast ratio may also be enhanced.

Figure 7:
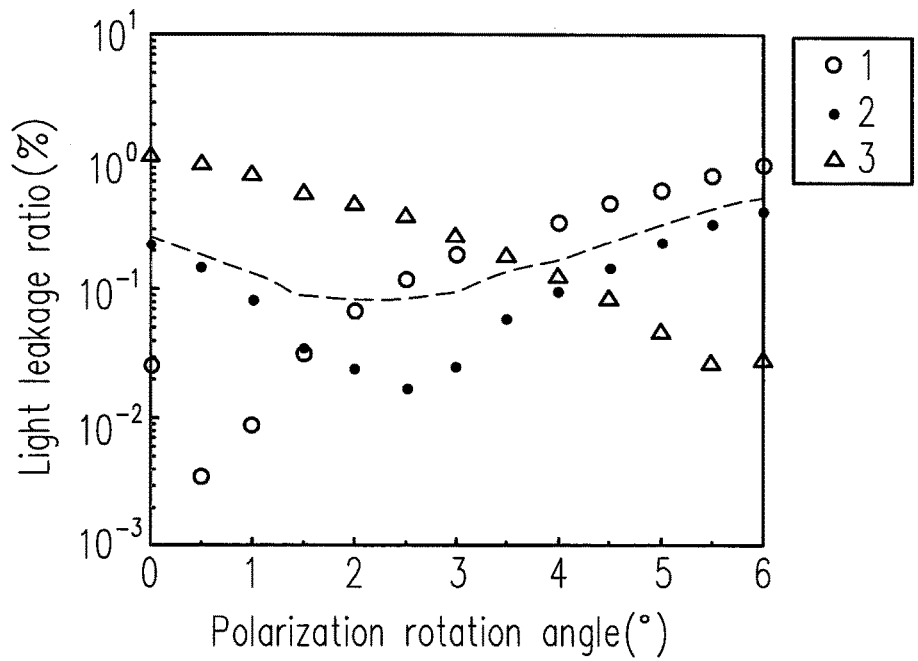
FIG. 7 is a relation diagram of a light leakage ratio and a polarization rotation angle in a display apparatus according to an embodiment of the invention.

FIG. 7 is a relation diagram of a light leakage ratio and a polarization rotation angle in a display apparatus according to an embodiment of the invention, in which the display apparatus has the refractive index $\Delta n_{(\lambda,T)}$ being approximately 0.17 to 0.19, the gap d being 7.4 μm and the Bragg reflection wavelength $\lambda_B$ being approximately 400 nm to 420 nm. Results of using red light, green light and blue light as the incident light are represented by curves 1, 2 and 3, respectively. A dot line in FIG. 7 indicates a result of white light generated by combining red light, green light and blue. In view of FIG. 7, the polarization rotation angle with the lowest light leakage ratio in red light is approximately 0.5°, the polarization rotation angle with the lowest light leakage ratio in green light is approximately 2.5° and the polarization rotation angle with the lowest light leakage ratio in blue light is approximately 5.5°. In summary, when the polarization rotation angle θ is 1.5° to 3.5°, the light leakage of the display apparatus may be effectively reduced.

In addition, when the polarization rotation angle θ is 2°, the light leakage ratio is approximately 0.08% and the contrast ratio is 1000. Under the same testing condition as above, in a conventional display apparatus with the polarizer having the polarization rotation angle θ being 0°, the light leakage ratio is 0.25% and the contrast ratio is 300. Thus, in comparison with the contrast ratio of the conventional display apparatus, the contrast ratio of the display apparatus of FIG. 7 is enhanced by three times more and has a favorable display quality.

Figure 8:
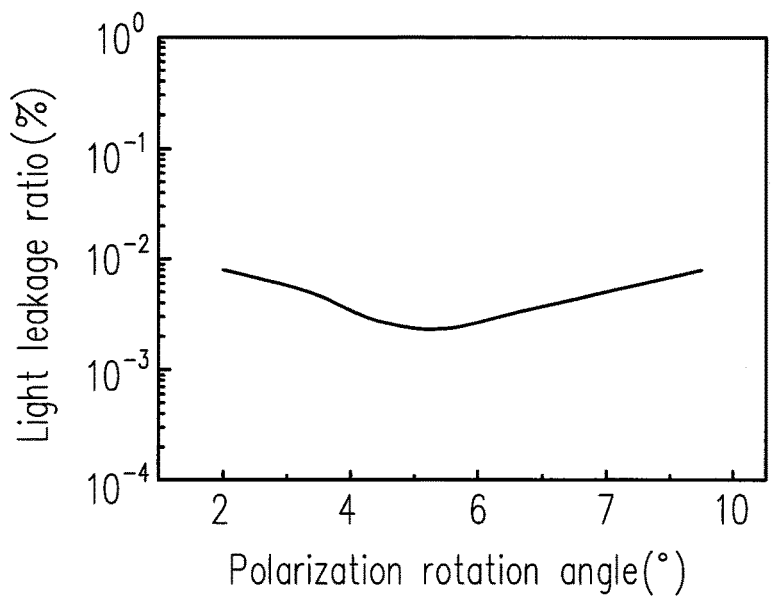
FIG. 8 is a relation diagram of a light leakage ratios and a polarization rotation angle in a display apparatus according to another embodiment of the invention.

FIG. 8 is a relation diagram of a light leakage ratio and a polarization rotation angle in a display apparatus according to another embodiment of the invention, in which the display apparatus has the refractive index Δn being approximately 0.18 to 0.2, the gap d being 10 μm and the Bragg reflection wavelength $\lambda_B$ being approximately 370 nm to 390 nm. In view of FIG. 8, when the polarization rotation angle θ is 3° to 7°, the light leakage of the display apparatus may be effectively reduced. In view of FIG. 7, the light leakage of overall white light (the dot line) is identical to the light leakage of green light which affects the contrast ratio even more than red light and blue light can do, and FIG. 8 shows a result of white light generated by combining red light, green light and blue.

Second Embodiment

Figure 9:
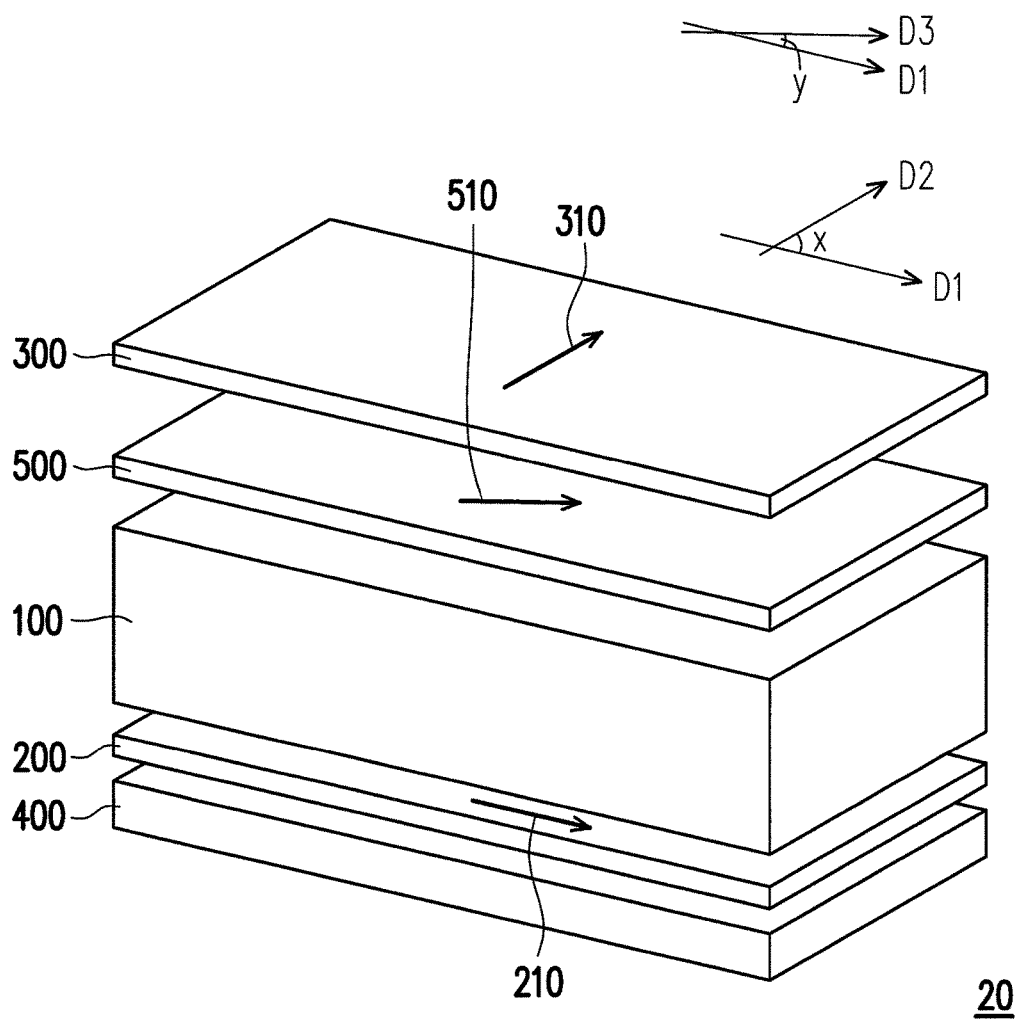
FIG. 9 is a three-dimensional schematic diagram of a display apparatus according to an embodiment of the invention.

FIG. 9 is a three-dimensional schematic diagram of a display apparatus according to an embodiment of the invention. Referring to FIG. 9 and FIG. 1 together, a display apparatus 20 of FIG. 9 is similar to the display apparatus 10 of FIG. 1, thus elements identical to that of FIG. 1 are indicated by the same reference numbers, and the descriptions thereof are not repeated. A difference between the display apparatus 20 of FIG. 9 and the display apparatus 10 of FIG. 1 is that, the display apparatus 20 of FIG. 9 further includes a biaxial compensation film 500 disposed between the display panel 100 and the second polarizer 300. In addition, detailed structure of each component in the display panel 100 is not illustrated in FIG. 9.

Generally, the biaxial compensation film is mainly used to increase a viewing angle. In the present embodiment, the biaxial compensation film 500 has a third optical axis 510 and the third optical axis 510 is parallel to a third direction D3. As shown in FIG. 9, the first optical axis 210 of the first polarizer 200 is parallel to the first direction D1, and the second optical axis 310 of the second polarizer 300 is parallel to the second direction D2, such that an included angle y is provided between the first optical axis 210 and the third optical axis 510 of the biaxial compensation film 500. In the present embodiment, the included angle y is 0°±θ2, and θ2 is 1° to 9°. In other embodiments, θ2 is 1.5° to 6.5°, and θ2 is more preferable to be 1.5° to 3.5°. In an embodiment, when the display medium is the dextrorotatory material, the included angle y is 90°+θ2. In an embodiment, when the display medium is the levorotatory material, the included angle y is 90°−θ2.

More specifically, in case the included angle x between the first optical axis 210 of the first polarizer 200 and the second optical axis 310 of the second polarizer 300 is 90°±θ1, and θ1 is 1° to 9°, the light leakage of the display apparatus 20 may be further reduced by further disposing the biaxial compensation film 500, so as to further enhance the display contrast ratio of the display apparatus 20.

Hereinafter, Table 1 is illustrated to describe, under the same Bragg reflection wavelength, influences of θ1 of the included angle x and θ2 of the included angle y to the contrast ratio and the viewing angle, in which $\lambda_B$ is the Bragg reflection wavelength of the material of the display medium.

TABLE 1

| | $\lambda_B$ = 410 nm<br>θ1 = 1.1° |
|---|---|
| θ2 = 0° | contrast ratio = 240<br>viewing angle = 50° |
| θ2 = 0.6° | contrast ratio = 640<br>viewing angle = 60° |
| θ2 = 0.8° | contrast ratio = 870<br>viewing angle = 65° |
| θ2 = 1.1° | contrast ratio = 1110<br>viewing angle = 85° |

More specifically, in view of Table 1, it can be known that when θ1 of the included angle x and θ2 of the included angle y both fall within the scope defined in the invention (i.e., 1° to 9°), the display apparatus 20 can provide a favorable display contrast ratio and a favorable viewing angle. Furthermore, it is more preferable that θ1 of the included angle x and θ2 of the included angle y are identical, so that the display apparatus 20 can provide the favorable display contrast ratio and the favorable viewing angle.

Moreover, in the present embodiment, a thickness of the biaxial compensation film 500 is 27.5 μm, and refractive indices of the biaxial compensation film 500 along a X-axis, a Y-axis and a Z-axis are Nx, Ny and Nz, respectively. Therein, in all wavelengths, Nx being 1.51, Ny being 1.5 and Nz being 1.505.

Figure 10:
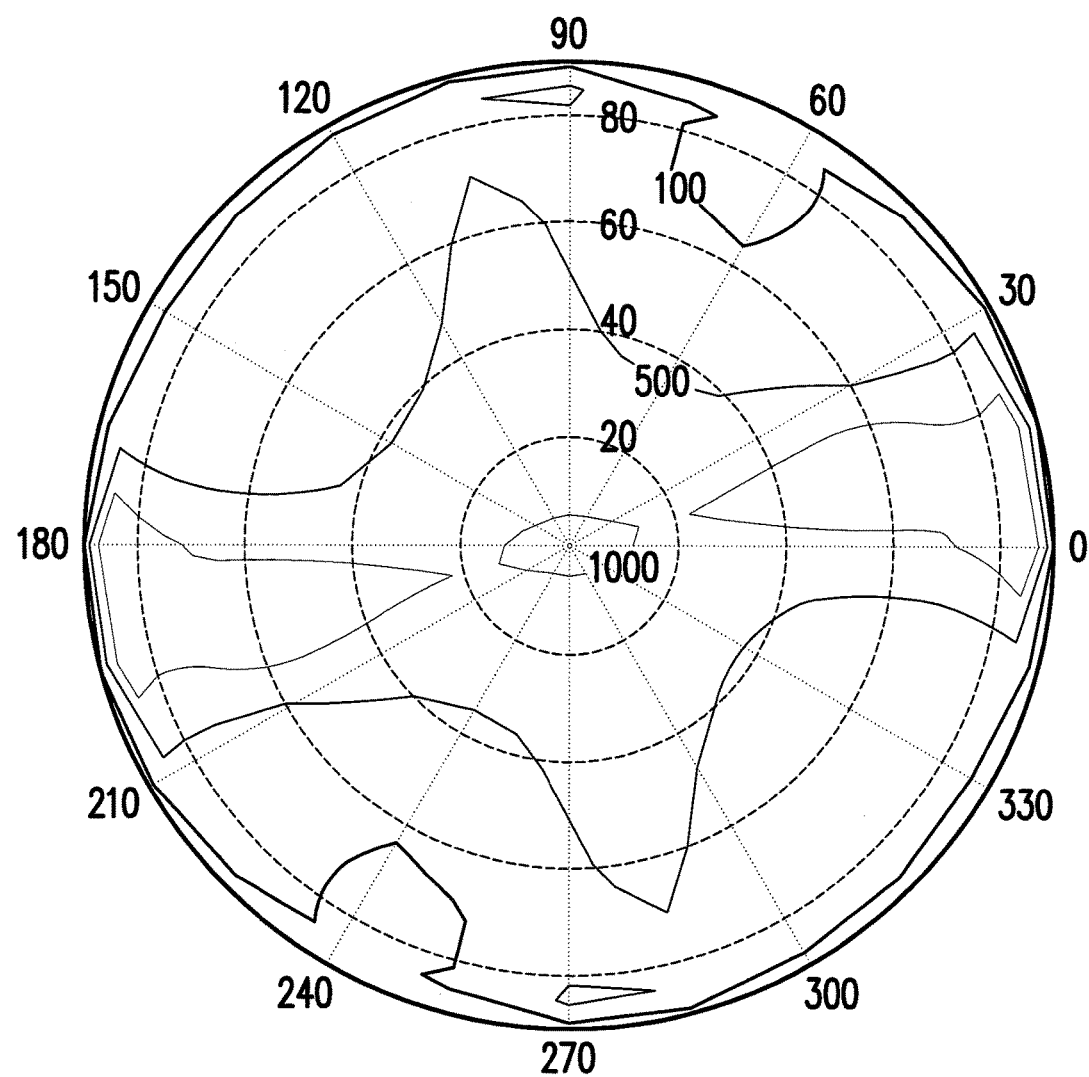
FIG. 10 is a schematic diagram of contrast ratios of a conventional display apparatus in various viewing angles, in which optical axes of two polarizers disposed in the display apparatus are orthogonal.
Figure 11:
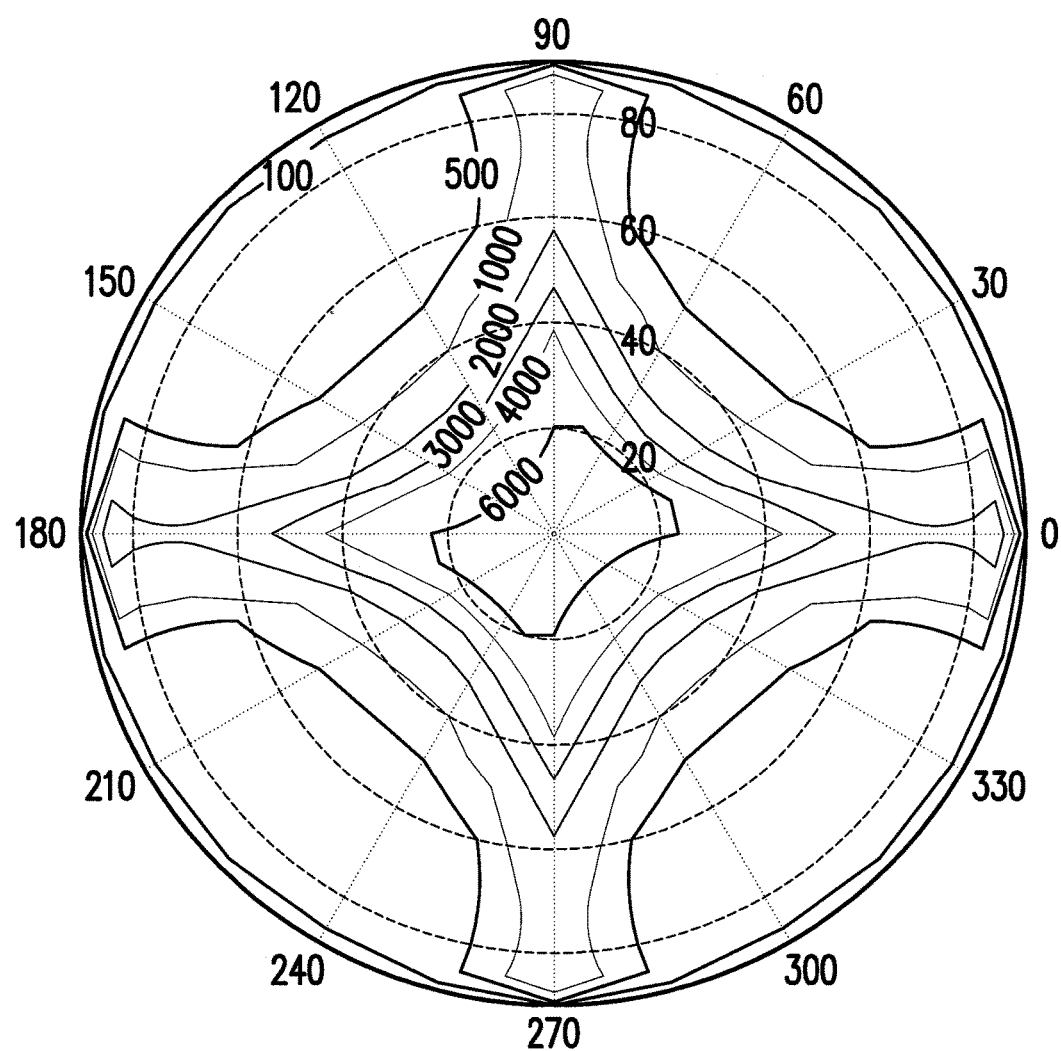
FIG. 11 is a schematic diagram of contrast ratios of the display apparatus 20 depicted in FIG. 9 in various angles.

FIG. 10 is a schematic diagram of contrast ratios of a conventional display apparatus in various viewing angles, in which optical axes of two polarizers disposed in the display apparatus are orthogonal. FIG. 11 is a schematic diagram of contrast ratios of the display apparatus 20 depicted in FIG. 9 in various angles. In the schematic diagrams of contrast ratios depicted in FIG. 10 and FIG. 11, a number next to a circumference indicates the viewing angle, a number on an enclosed curve within the circle indicates the contrast ratio. It can be known from FIG. 10 and FIG. 11 that, a center contrast ratio measured in the display apparatus 20 is 6000, and a center contrast ratio measured in the conventional display apparatus is 1000. Further, under different viewing angles, in comparison with the conventional display apparatus, the display apparatus 20 can provide a more preferable contrast ratio. In other words, by disposing the first polarizer 200, the second polarizer 300 and the biaxial compensation film 500 in the display apparatus 20, the display contrast ratios of the display apparatus 20 under different viewing angles can be enhanced.

Third Embodiment

Figure 12A:
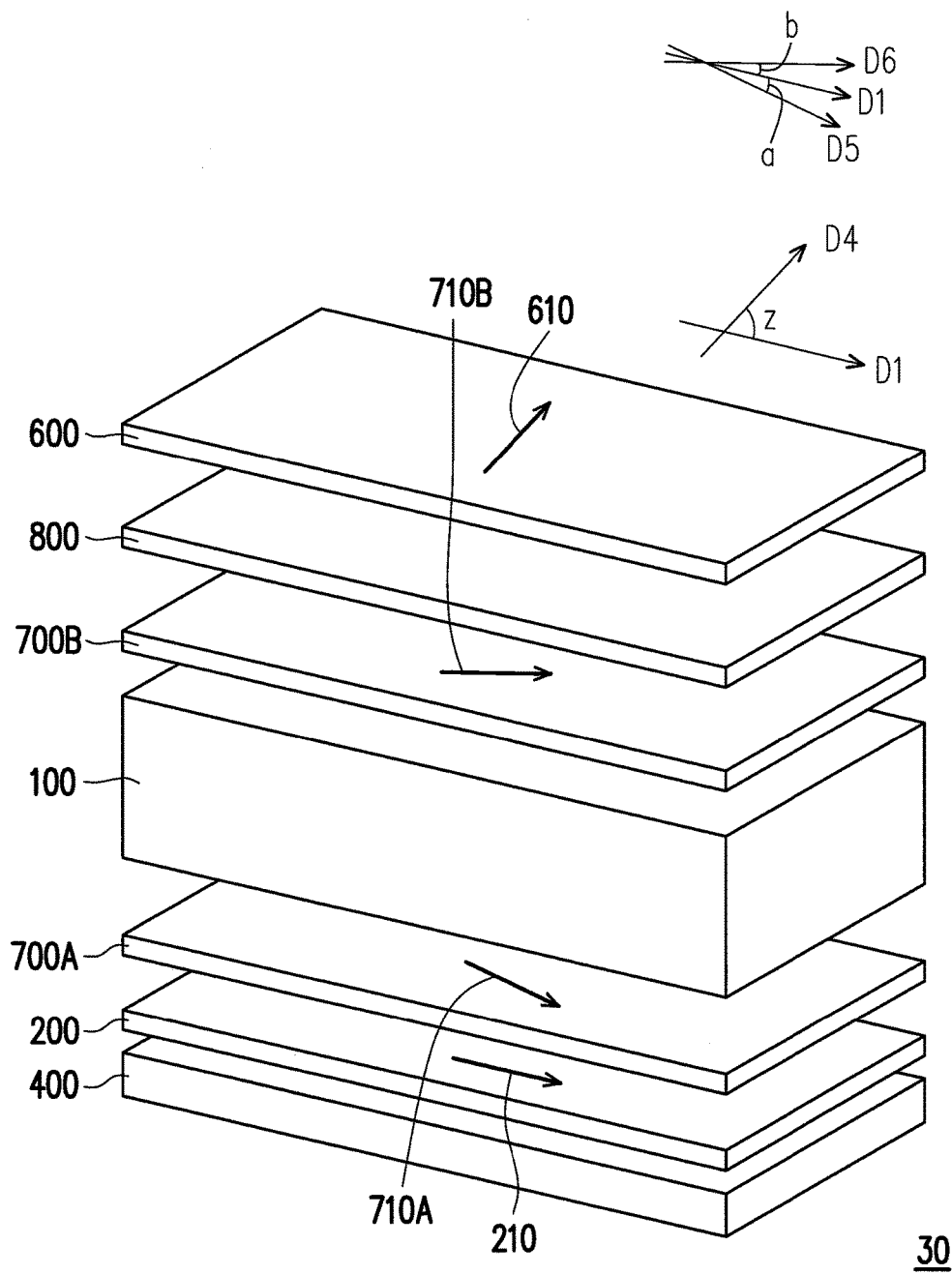
FIG. 12A is a three-dimensional schematic view of a display apparatus according to an embodiment of the invention.

FIG. 12A is a three-dimensional schematic view of a display apparatus according to an embodiment of the invention. Referring to FIG. 12A and FIG. 1 together, a display apparatus 30 of FIG. 12A is similar to the display apparatus 10 of FIG. 1, thus elements identical to that of FIG. 1 are indicated by the same reference numbers, and the descriptions thereof are not repeated. In addition, detailed structure of each component in the display panel 100 is not illustrated in FIG. 12A.

More specifically, a difference between the display apparatus 30 of FIG. 12A and the display apparatus 10 of FIG. 1 is that, a second polarizer 600 of FIG. 12A has a second optical axis 610 in which the second optical axis 610 is parallel to a fourth direction D4, and an included angle z between the second optical axis 610 and the first optical axis 210 is 90°. The display apparatus 30 of FIG. 12A further includes a first positive A-plate compensation film 700A, a second positive A-plate compensation film 700B and a biaxial compensation film 800. The first positive A-plate compensation film 700A is disposed between the display panel 100 and the first polarizer 200, and the second positive A-plate compensation film 700B is disposed between the display panel 100 and the second polarizer 600. The biaxial compensation film 800 is disposed on the second positive A-plate compensation film 700B and located between the display panel 100 and the second polarizer 600.

In the present embodiment, the biaxial compensation film 800 is used to improve the viewing angle of the display panel, and the biaxial compensation film 800 can be any biaxial compensation film well-known by persons with ordinary skill in the art, such as the biaxial compensation film 500 in the foregoing embodiment. Further, in FIG. 12A, although it is illustrated that the biaxial compensation film 800 is disposed between the display panel 100 and the second polarizer 600 as an example, the invention is not limited thereto. In an embodiment, the biaxial compensation film 800 can also be disposed between the display panel 100 and the first polarizer 200. In another embodiment, the biaxial compensation film 800 can also be disposed between the display panel 100 and the second polarizer 600 as well as between the display panel 100 and the first polarizer 200. In yet another embodiment, the display apparatus 30 can also be provided without disposing the biaxial compensation film 800.

The first positive A-plate compensation film 700A and the second positive A-plate compensation film 700B are used to compensate the polarization rotation characteristic of the blue phase liquid crystal. More specifically, the first positive A-plate compensation film 700A has a fifth optical axis 710A, and the second positive A-plate compensation film 700B has a sixth optical axis 710B, in which the fifth optical axis 710A is parallel to a fifth direction D5, and the sixth optical axis 710B is parallel to a sixth direction D6. As shown in FIG. 12A, an included angle a is provided between the fifth optical axis 710A and the first optical axis 210, and an included angle b is provided between the sixth optical axis 710B and the first optical axis 210. In the present embodiment, the included angle a is 0°−θ3 and θ3 is 1° to 9'; the included angle b is 0°+θ4 and θ4 is 1° to 9'; and θ4 is identical to θ3. In other embodiments, θ3 and θ4 are 1.5° to 6.5°, and θ3 and θ4 are more preferable to be 1.5° to 3.5°.

Further, in the present embodiment, the first positive A-plate compensation film 700A and the second positive A-plate compensation film 700B are both a uniaxial compensation film which is optically positive, namely, the first positive A-plate compensation film 700A and the second positive A-plate compensation film 700B have Ne being greater than No and an optical birefringence Δn being greater than 0, in which No referring to a refractive index of the liquid crystal molecule for an ordinary ray, Ne referring to a refractive index of the liquid crystal molecule for an extraordinary ray, and the optical birefringence Δn referring to Ne-No which is a function of the wavelength. Furthermore, in the present embodiment, an optimization of the optical birefringence Δn for an optical rotatory power (ORP) of the blue phase liquid crystal is obtained under wavelengths of 450 nm, 550 nm and 650 nm.

As described above, in the display apparatus having the display medium of the blue phase liquid crystal, since the blue phase liquid crystal molecules are aligned in form of the double twist cylinder, the light leakage with certain degrees may still occur even if the optical axes of the two polarizers are orthogonal (i.e., the included angle between the optical axes of the two polarizers is 90°). Accordingly, in the first embodiment, by disposing the first polarizer 200 and the second polarizer 300 with the included angle x of the optical axes as 90°±θ1, and θ1 is 1° to 9°, the light leakage of the display apparatus 10 can be reduced, so as to further enhance an effect of the display contrast ratio of the display apparatus 10.

Therefore, based on the same spirit, in the third embodiment, in case the first polarizer 200 and the second polarizer 600 are orthogonal, by disposing the first positive A-plate compensation film 700A having the included angle a with the first optical axis 210 of the first polarizer 200 which is 0°−θ3 and θ3 is 1° to 9°, and the second positive A-plate compensation film 700B having the included angle b with the first optical axis 210 of the first polarizer 200 which is 0°+θ4 and θ4 is 1° to 9°, the light leakage of the display apparatus 30 can also be reduced so as to further enhance the display contrast ratio of the display apparatus 30.

From another prospective, as described above, the material of the display medium can generally be divided into the levorotatory material and the dextrorotatory material, and the polarization rotation angle of the display apparatus is different based on the material of the display medium used being the levorotatory material or the dextrorotatory material. More specifically, in the present embodiment, the display medium of the display apparatus 30 depicted in FIG. 12A is the dextrorotatory material. In other words, when the display medium is the dextrorotatory material, the included angle a of the display apparatus 30 is set to 0°−θ3 and θ3 is 1° to 9°, and the included angle b is set to 0°+θ4 and θ4 is 1° to 9°, and the θ4 is identical to θ3, the light leakage of the display apparatus 30 can be effectively reduced, so as to further enhance the display contrast ratio of the display apparatus 30.

Furthermore, in view of the foregoing description, it can be known that the deviation angle (i.e., θ3 and θ4) changes with the Bragg reflection wavelength $\lambda_B$ of the material of the display medium. For instance, in case the Bragg reflection wavelength $\lambda_B$ of the blue phase liquid crystal being 380 nm, the optical rotatory power being dextrorotatory, the gap d being 7.4 μm and the thickness of the A-plate compensation film being 10 μm, the included angle a of the display apparatus 30 is −2° (i.e., θ3 is 2°), and the included angle b is +2° (i.e., θ4 is 2°), and the optical birefringence Δn of the first positive A-plate compensation film 700A and the second positive A-plate compensation film 700B are 0.006, 0.005 and 0.003 in the wavelengths of 450 nm, 550 nm and 650 nm, respectively. As another example, in case the Bragg reflection wavelength $\lambda_B$ of the blue phase liquid crystal being 410 nm, the optical rotatory power being dextrorotatory, the gap d being 7.4 μm and the thickness of the A-plate compensation film being 10 μm, the included angle a of the display apparatus 30 is −1.5° (i.e., θ3 is 1.5°), and the included angle b is +1.5° (i.e., θ4 is 1.5°), and the optical birefringence Δn of the first positive A-plate compensation film 700A and the second positive A-plate compensation film 700B are 0.012, 0.007 and 0.004 in the wavelengths of 450 nm, 550 nm and 650 nm, respectively. However, the invention is not limited thereto. In other embodiments, the display apparatus can also use the display medium of levorotatory material, as shown in FIG. 12B.

Figure 12B:
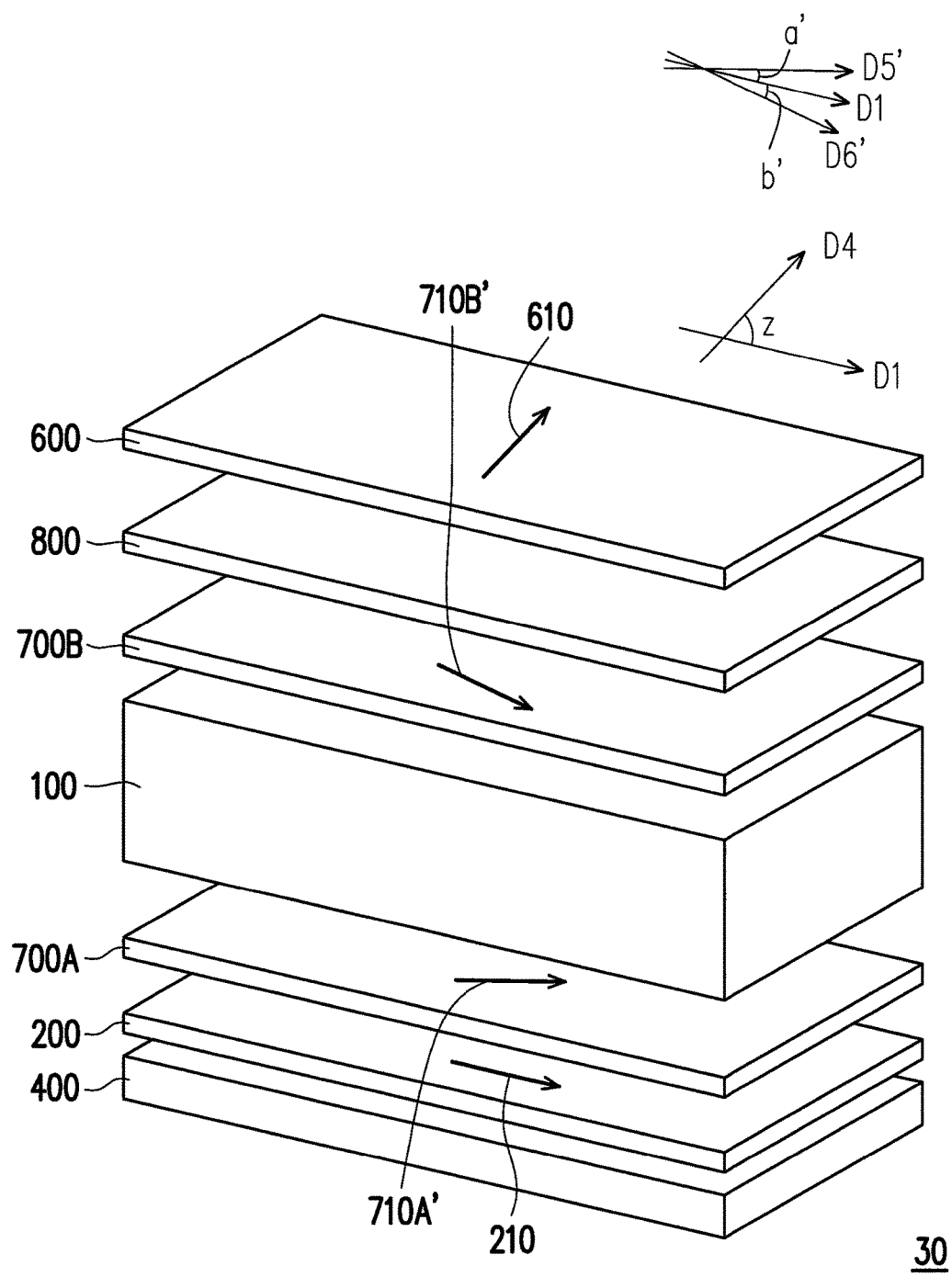
FIG. 12B is a three-dimensional schematic view of a display apparatus according to another embodiment of the invention.

FIG. 12B is a three-dimensional schematic view of a display apparatus according to another embodiment of the invention. Referring to FIG. 12B and FIG. 12A together, a display apparatus 30' of FIG. 12B is similar to the display apparatus 30 of FIG. 12A, thus elements identical to FIG. 12A are indicated by the same reference numbers, and the descriptions thereof are not repeated.

More specifically, a difference between the display apparatus 30' of FIG. 12B and the display apparatus 30 of FIG. 12A is that, a first positive A-plate compensation film 700' of the display apparatus 30' of FIG. 12B has a fifth optical axis 710A' and the second positive A-plate compensation film 700B' has a sixth optical axis 710B', in which the fifth optical axis 710A' is parallel to a fifth direction D5', and the sixth optical axis 710B' is parallel to a sixth direction D6'. As shown in FIG. 12B, an included angle a' is provided between the fifth optical axis 710A' and the first optical axis 210, and an included angle b' is provided between the sixth optical axis 710B' and the first optical axis 210. In the present embodiment, the included angle a' is 0°+θ3 and θ3 is 1° to 9°; the included angle b' is 0°−θ4 and θ4 is 1° to 9°; and θ4 is identical to θ3. Therein, θ3 and θ4 are 1.5° to 6.5°, and θ3 and θ4 are more preferable to be 1.5° to 3.5°. For instance, in case the Bragg reflection wavelength $\lambda_B$ of the blue phase liquid crystal being 380 nm, the optical rotatory power being levorotatory, the gap d being 7.4 μm and the thickness of the A-plate compensation film being 10 μm, the included angle a' of the display apparatus 30' is +2° (i.e., θ3 is 2°), and the included angle b' is −2° (i.e., θ4 is 2°), and the optical birefringence Δn of the first positive A-plate compensation film 700A' and the second positive A-plate compensation film 700B' are 0.006, 0.005 and 0.003 in the wavelengths of 450 nm, 550 nm and 650 nm, respectively.

Based on above, when the display medium is the levorotatory material, the included angle a' of the display apparatus 30' is set to 0°+θ3 and θ3 is 1° to 9°, and the included angle b' is set to 0°–θ4 and θ4 is 1° to 9°, and the θ4 is identical to θ3, the light leakage of the display apparatus 30' can be effectively reduced, so as to further enhance the display contrast ratio of the display apparatus 30'.

Figure 13:
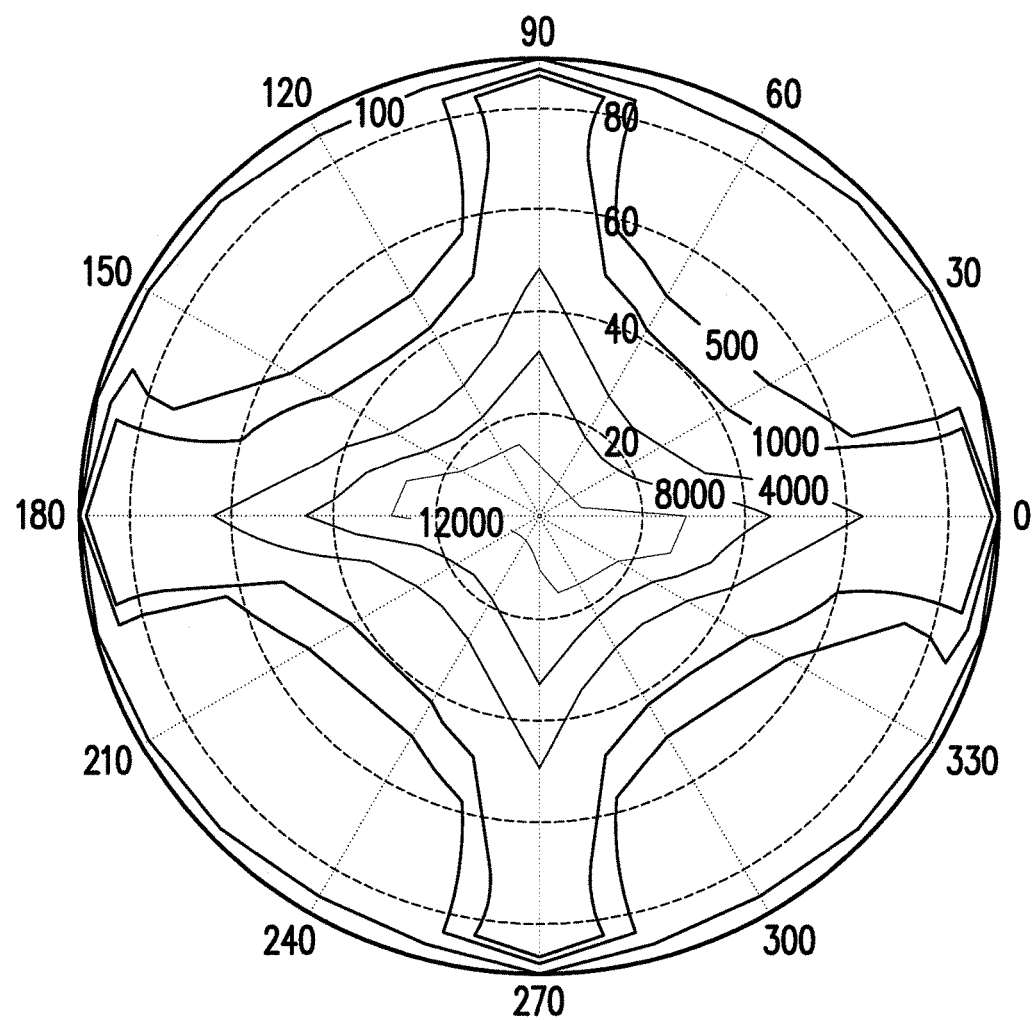
FIG. 13 is a schematic diagram of contrast ratios of the display apparatus 30 depicted in FIG. 12A in various angles.

FIG. 13 is a schematic diagram of contrast ratios of the display apparatus 30 depicted in FIG. 12A in various angles. Referring to FIG. 10 and FIG. 13 together, a center contrast ratio measured in the display apparatus 30 is 12000, and a center contrast ratio measured in the conventional display apparatus is 1000. Further, under different viewing angles, in comparison with the conventional display apparatus, the display apparatus 30 can provide a more preferable contrast ratio. In other words, by disposing the first positive A-plate compensation film 700A and the second positive A-plate compensation film 700B in the display apparatus 30, the display contrast ratios of the display apparatus 30 under different viewing angles can be enhanced.

Fourth Embodiment

Figure 14:
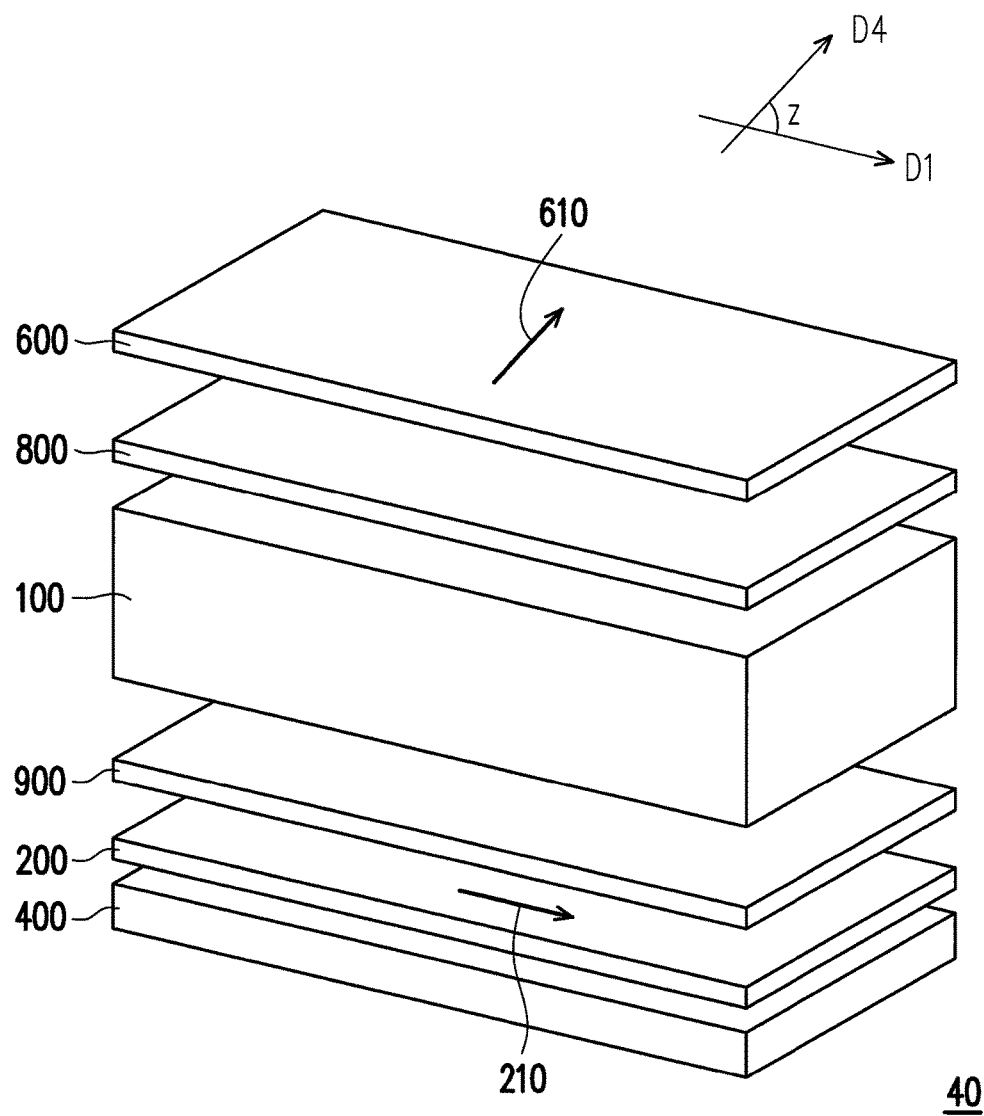
FIG. 14 is a three-dimensional schematic diagram of a display apparatus according to an embodiment of the invention.
Figure 15:
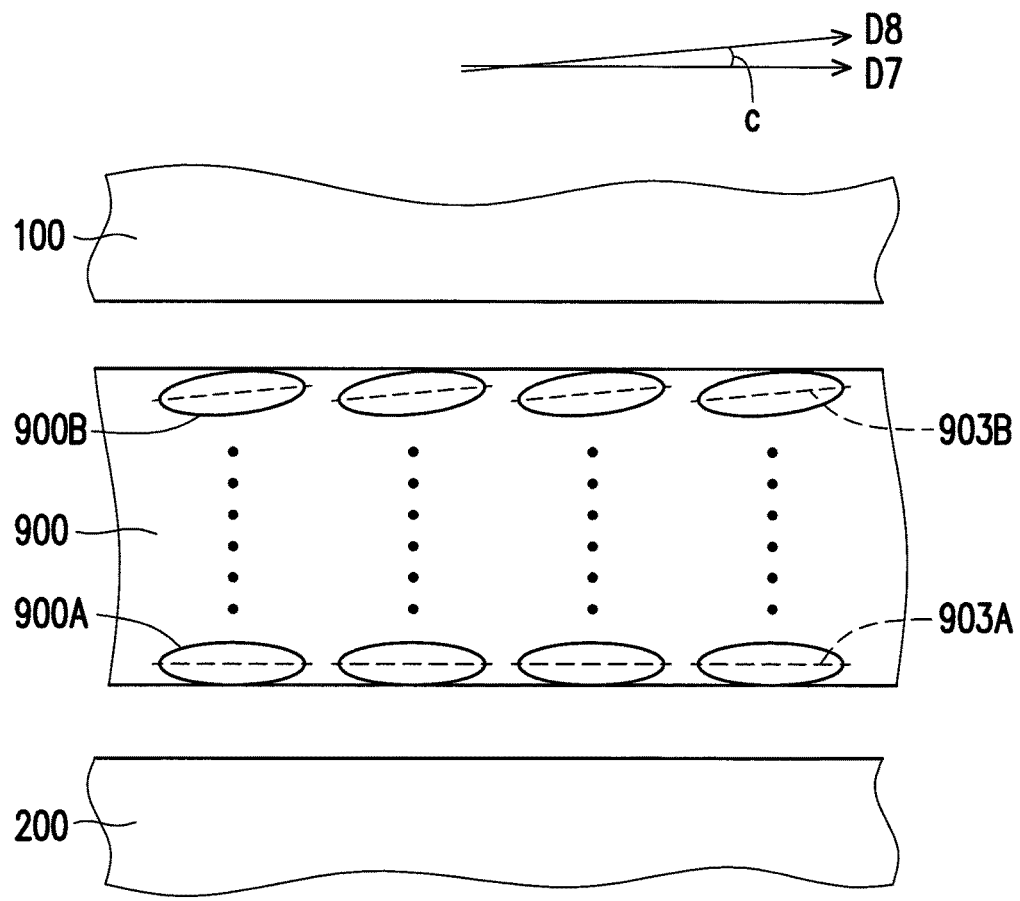
FIG. 15 is a partially-enlarged cross-sectional diagram of the display apparatus depicted in FIG. 14.

FIG. 14 is a three-dimensional schematic diagram of a display apparatus according to an embodiment of the invention. FIG. 15 is a partially-enlarged cross-sectional diagram of the display apparatus depicted in FIG. 14. Referring to FIG. 14, FIG. 15 and FIG. 13 together, a display apparatus 40 of FIG. 14 is similar to the display apparatus 30 of FIG. 13, thus elements identical to that of FIG. 13 are indicated by the same reference numbers, and the descriptions thereof are not repeated. In addition, detailed structure of each component in the display apparatus 40 is not illustrated in FIG. 14.

More specifically, a difference between the display apparatus 40 of FIG. 14 and the display apparatus 30 of FIG. 13 is that, the display apparatus 40 of FIG. 14 is provided without disposing the first positive A-plate compensation film 700A and the second positive A-plate compensation film 700B, but the display apparatus 40 of FIG. 14 includes a compensation film 900 disposed between the display panel 100 and the first polarizer 200, in which the compensation film 900 is composed of a plurality of twist nematic liquid crystal molecules.

More specifically, among the twist nematic liquid crystal molecules, a twist nematic liquid crystal molecule 900A closest to the first polarizer 200 has a seventh optical axis 903A, and a twist nematic liquid crystal molecule 900B closest to the display panel 100 has an eighth optical axis 903B, in which the seventh optical axis 903A is parallel to a seventh direction D7, and the eighth optical axis 903B is parallel to an eighth direction D8. As shown in FIG. 15, an included angle c is provided between the seventh optical axis 903A and the eighth optical axis 903B. In the present embodiment, the included angle c is 0°±θ5, and θ5 is 1° to 9°. In other embodiments, θ5 is 1.5° to 6.5°, and θ5 is more preferable to be 1.5° to 3.5°. Further, in the present embodiment, the twist nematic liquid crystal molecule includes a light curing liquid crystal material such as RM257 which has a molecular structure as follows:

As described above, in the display apparatus having the display medium of the blue phase liquid crystal, due to the polarization rotation characteristic of the blue phase liquid crystal, the light leakage with certain degrees may still occur even if the optical axes of the two polarizers are orthogonal (i.e., the included angle between the optical axes of the two polarizers is 90°). Accordingly, in the first embodiment, by disposing the first polarizer 200 and the second polarizer 300 with the included angle x of the optical axes as 90°±θ1, and θ1 is 1° to 9°, the light leakage of the display apparatus 10 can be reduced, so as to further enhance an effect of the display contrast ratio of the display apparatus 10.

Therefore, based on the same spirit, in the fourth embodiment, in case the first polarizer 200 and the second polarizer 600 are orthogonal, by disposing the compensation film 900 having the twist nematic liquid crystal molecules, in which the included angle c provided between the seventh optical axis 903A of the twist nematic liquid crystal molecule 900A closest to the first polarizer 200 and the eighth optical axis 903B of the twist nematic liquid crystal molecule 900B closest to the display panel 100 is 0°±θ5, and θ5 is 1° to 9°, the light leakage of the display apparatus 40 can also be reduced so as to further enhance the display contrast ratio of the display apparatus 40.

Figure 16:
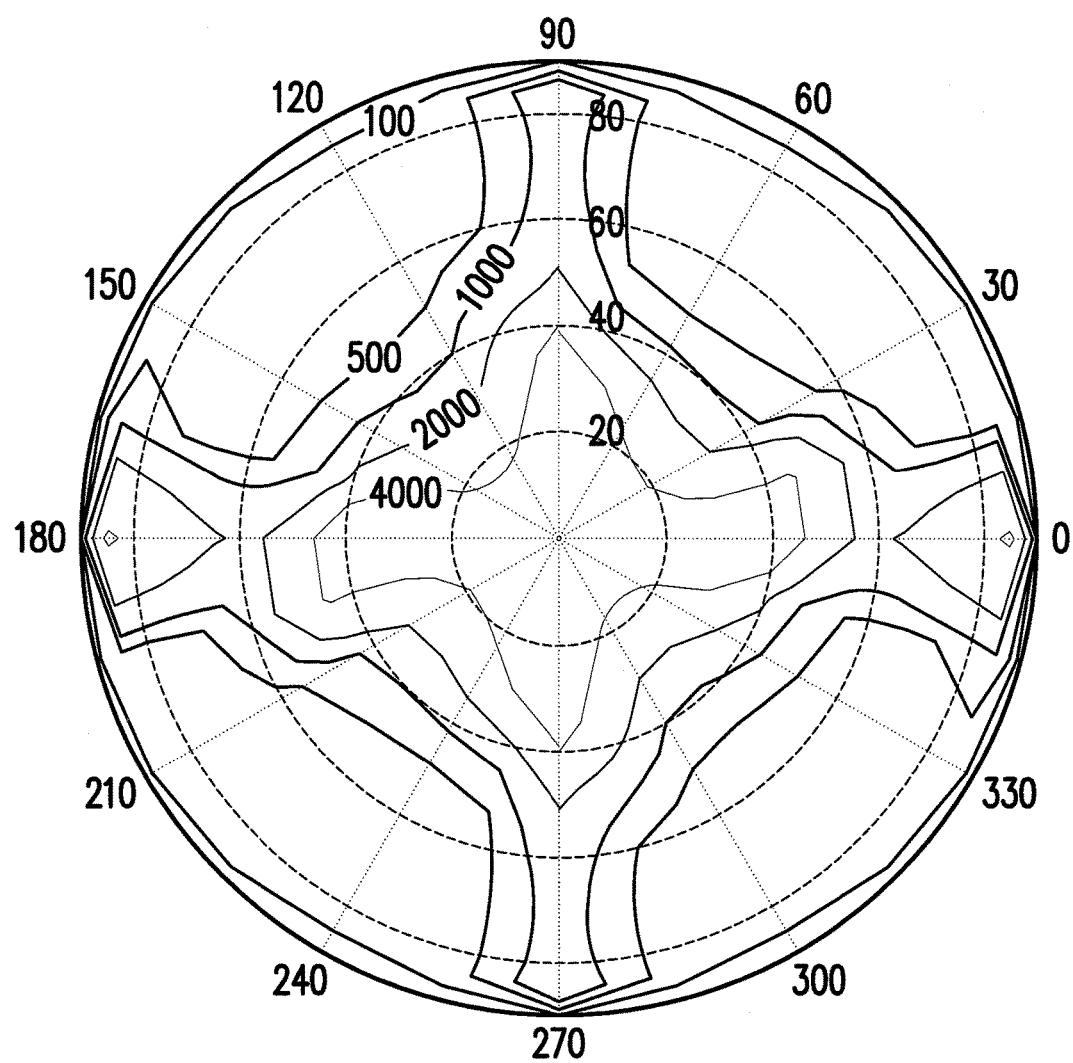
FIG. 16 is a schematic diagram of contrast ratios of the display apparatus 40 depicted in FIG. 14 in various angles.

FIG. 16 is a schematic diagram of contrast ratios of the display apparatus 40 depicted in FIG. 14 in various angles. Referring to FIG. 10 and FIG. 16 together, a center contrast ratio measured in the display apparatus 40 is 4000, and a center contrast ratio measured in the conventional display apparatus is 1000. Further, under different viewing angles, in comparison with the conventional display apparatus, the display apparatus 40 can provide a more preferable contrast ratio. In other words, by disposing the compensation film 900 in the display apparatus 40, the display contrast ratios of the display apparatus 40 under different viewing angles can be enhanced.

In summary, in the display apparatus according to the foregoing embodiments, an optical film having an optical axis deviated by an angle (e.g., θ1 to θ5 all being 1° to) 9° is disposed, such that the light leakage that can be generated by the display apparatus may be effectively reduced so as to enhance the display contrast ratio of the display apparatus thereby improving the display quality of the liquid crystal display.

What is claimed is:
1. A display apparatus, comprising:
a display panel, comprising:
a pixel array substrate comprising a plurality of pixel units, wherein each of the pixel units has a first electrode and a second electrode alternately arranged, and a lateral electric field is existed between the first electrode and the second electrode;
an opposite substrate disposed opposite to the pixel array substrate; and
a display medium comprising blue phase liquid crystal disposed between the pixel array substrate and the

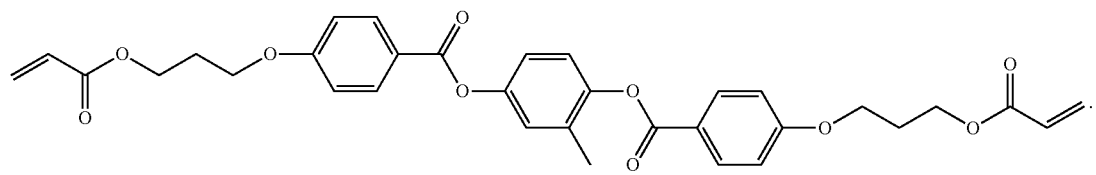 [SMILES: C=CC(=O)OCCCOc1ccc(C(=O)Oc2ccc(OC(=O)c3ccc(OCCCOC(=O)C=C)cc3)c(C)c2)cc1]

opposite substrate, wherein the display medium is optically isotropic, and the display medium is optically anisotropic when driven by an electrical field;

a first polarizer disposed on the pixel array substrate;

a second polarizer disposed on the opposite substrate, wherein a first included angle between a first optical axis of the first polarizer and a second optical axis of the second polarizer is $9°±θ1$, and $θ1$ is $1°$ to $9°$; and a biaxial compensation film disposed on the opposite substrate, and located between the display panel and the second polarizer, wherein a second included angle between the first optical axis of the first polarizer and a third optical axis of the biaxial compensation film is $0°±θ2$, and $θ2$ is $1°$ to $9°$, and wherein $θ1$ is identical to $θ2$.

2. The display apparatus of claim 1, wherein $θ1$ is $1.5°$ to $6.5°$.

3. A display apparatus, comprising:

a display panel, comprising:

a pixel array substrate comprising a plurality of pixel units, wherein each of the pixel units has a first electrode and a second electrode alternately arranged, and a lateral electric field is existed between the first electrode and the second electrode;

an opposite substrate disposed opposite to the pixel array substrate; and a display medium disposed between the pixel array substrate and the opposite substrate;

a first polarizer disposed on the pixel array substrate;

a light source module disposed on the pixel array substrate, wherein the light source module is disposed in proximity with the first polarizer, and the first polarizer is located between the display panel and the light source module;

a second polarizer disposed on the opposite substrate, wherein a first included angle between a first optical axis of the first polarizer and a second optical axis of the second polarizer is $90°$;

a first positive A-plate compensation film disposed on the pixel array substrate, and located between the display panel and the first polarizer, wherein a second included angle is provided between the first optical axis of the first polarizer and a fifth optical axis of the first positive A-plate compensation film; and a second positive A-plate compensation film disposed on the opposite substrate, and located between the display panel and the second polarizer, wherein a third included angle is provided between the first optical axis of the first polarizer and a sixth optical axis of the second positive A-plate compensation film, wherein the second included angle is $0°−θ1$ and $θ1$ is $1°$ to $9°$ while the third included angle is $0°+θ2$ and $θ2$ is $1°$ to $9°$, or the second included angle is $0°+θ1$ and $θ1$ is $1°$ to $9°$ while the third included angle is $0°−θ2$ and $θ2$ is $1°$ to $9°$.

4. The display apparatus of claim 3, further comprising at least one biaxial compensation film configured to improve the viewing angle of the display panel.

5. The display apparatus of claim 3, wherein $θ1$ is identical to $θ2$.

\* \* \* \* \*